(12) United States Patent
Ohishi

(10) Patent No.: US 8,353,051 B2
(45) Date of Patent: Jan. 8, 2013

(54) IMAGE FORMING APPARATUS, ACCESS CONTROL METHOD, ACCESS CONTROL PROGRAM AND COMPUTER READABLE INFORMATION RECORDING MEDIUM

(75) Inventor: Tsutomu Ohishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1417 days.

(21) Appl. No.: 11/608,970

(22) Filed: Dec. 11, 2006

(65) Prior Publication Data
US 2007/0143861 A1 Jun. 21, 2007

(30) Foreign Application Priority Data

Dec. 16, 2005 (JP) .................................. 2005-363353
Nov. 30, 2006 (JP) .................................. 2006-324750

(51) Int. Cl.
*G06F 17/30* (2006.01)
(52) U.S. Cl. .............. 726/28; 726/26; 726/27; 707/999; 358/1.14; 358/1.15; 709/226
(58) Field of Classification Search ............... 726/26, 726/28, 27; 358/1.15, 1.14
See application file for complete search history.

(56) References Cited

U.S. PATENT DOCUMENTS

| | | | |
|---|---|---|---|
| 6,607,139 B1 * | 8/2003 | Jui-Chang et al. ............. | 235/492 |
| 2003/0101254 A1 * | 5/2003 | Sato .............................. | 709/223 |
| 2004/0199538 A1 * | 10/2004 | Matsuda et al. .............. | 707/102 |
| 2005/0047812 A1 * | 3/2005 | Takemura ...................... | 399/75 |
| 2005/0066069 A1 | 3/2005 | Kaji | |
| 2005/0234859 A1 * | 10/2005 | Ebata ............................ | 707/1 |
| 2005/0241001 A1 * | 10/2005 | Parry et al. ................... | 726/27 |
| 2006/0018223 A1 * | 1/2006 | Ji et al. ........................ | 369/47.12 |
| 2006/0290967 A1 * | 12/2006 | Sumitomo et al. ........... | 358/1.14 |

FOREIGN PATENT DOCUMENTS

| | | |
|---|---|---|
| JP | 07-297818 A | 11/1995 |
| JP | 9-37011 A | 2/1997 |
| JP | 11-191797 | 7/1999 |
| JP | 2002-222397 A | 8/2002 |
| JP | 2003-16176 A | 1/2003 |
| JP | 2003-44435 A | 2/2003 |
| JP | 2003-167641 A | 6/2003 |
| JP | 2004-252727 A | 9/2004 |
| JP | 2004-326603 A | 11/2004 |
| JP | 2005-182279 A | 7/2005 |
| JP | 2005-202770 | 7/2005 |
| JP | 2005-269619 | 9/2005 |
| JP | 2005-300605 | 10/2005 |
| JP | 2005-301500 A | 10/2005 |
| JP | 2006-148876 | 6/2006 |

OTHER PUBLICATIONS

Office Action issued Apr. 5, 2011 in Japanese Patent Application No. 2006-324750. Japanese Office Action mailed on Jul. 17, 2012, issued for JP Application No. 2011-123086.
Japanese Office Action in Applications No. JP 2011-123086 dated Nov. 6, 2012.

* cited by examiner

*Primary Examiner* — Taghi Arani
*Assistant Examiner* — Jason Lee
(74) *Attorney, Agent, or Firm* — Oblon, Spivak, McClelland, Maier & Neustadt, L.L.P.

(57) ABSTRACT

An image forming apparatus provided with an interface for a portable information recording medium, has an access control part carrying out access control, for respective ones of a plurality of resources which the image forming apparatus has, based on access control information defining whether or not usage thereof by a user is allowed, wherein the access control part carries out access control based on the access control information stored in the portable information recording medium.

11 Claims, 19 Drawing Sheets

| | USER 1 | USER 2 | USER 3 | USER 4 | USER 5 |
|---|---|---|---|---|---|
| COPY APPLICATION OPERATION | x | - | x | x | x |
| MONOCHROME SCANNING IN COPYING | r | - | r | r | r |
| MONOCHROME PRINTING IN COPYING | w | - | - | - | - |
| COLOR SCANNING IN COPYING | r | - | r | - | - |
| COLOR PRINTING IN COPYING | w | - | - | - | - |
| IMAGE STORAGE IN COPYING | rw | - | r | w | - |
| SCANNER APPLICATION OPERATION | x | x | x | - | - |
| MONOCHROME SCANNING IN SCANNING | r | r | r | - | - |
| COLOR SCANNING IN SCANNING | r | r | - | - | - |
| MONOCHROME PRINTING IN SCANNING | w | w | - | - | - |
| COLOR PRINTING IN SCANNING | w | - | - | - | - |
| FTP TRANSFER IN SCANNING | x | x | - | - | - |
| MAIL TRANSFER IN SCANNING | x | - | - | - | - |

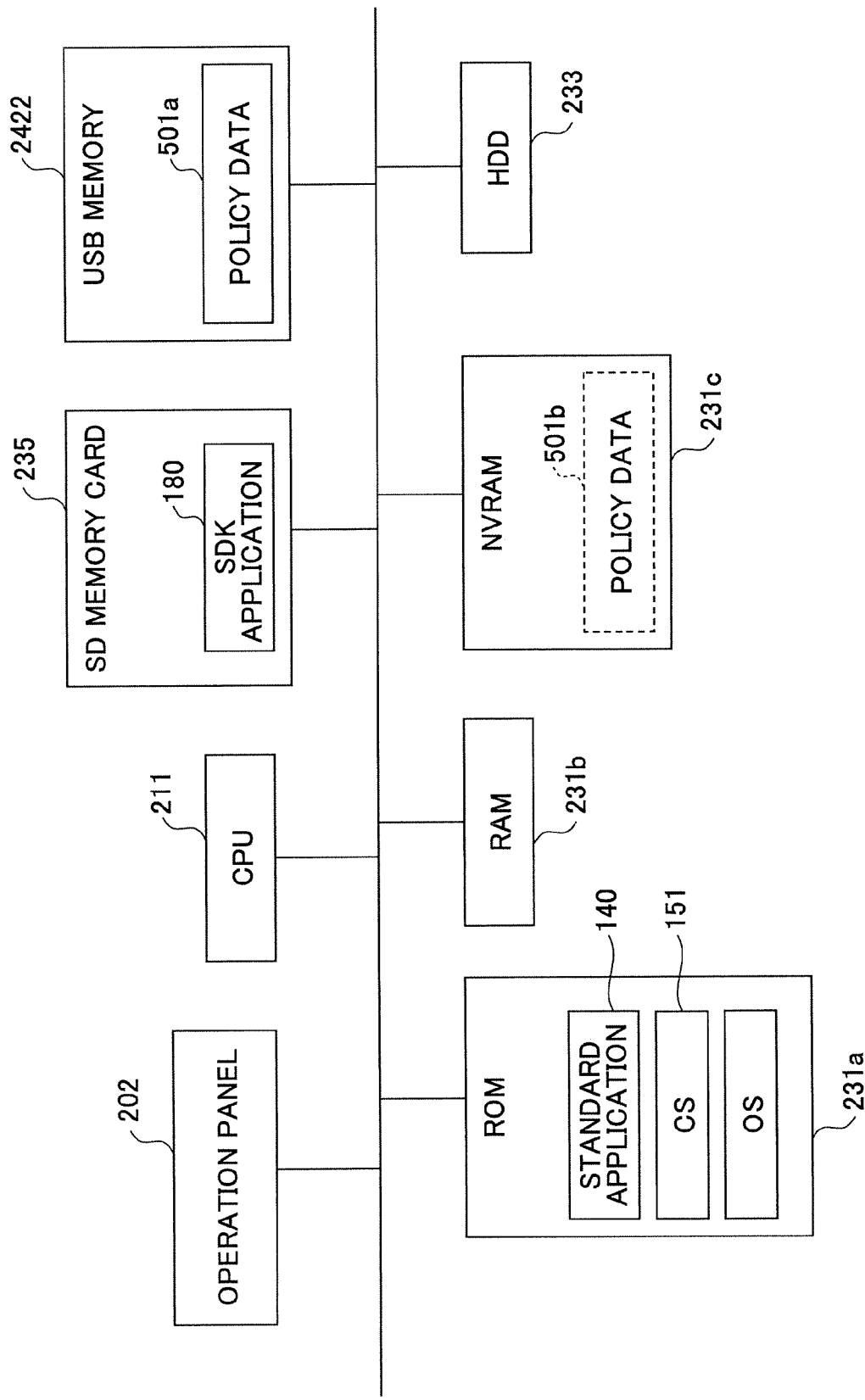

FIG.5

| | USER 1 | USER 2 | USER 3 | USER 4 | USER 5 |
|---|---|---|---|---|---|
| COPY APPLICATION OPERATION | x | – | x | x | x |
| MONOCHROME SCANNING IN COPYING | r | – | r | r | r |
| MONOCHROME PRINTING IN COPYING | w | – | – | – | – |
| COLOR SCANNING IN COPYING | r | – | r | – | – |
| COLOR PRINTING IN COPYING | w | x | – | w | – |
| IMAGE STORAGE IN COPYING | rw | r | r | – | – |
| SCANNER APPLICATION OPERATION | x | r | x | – | – |
| MONOCHROME SCANNING IN SCANNING | r | w | r | – | – |
| COLOR SCANNING IN SCANNING | r | – | – | – | – |
| MONOCHROME PRINTING IN SCANNING | w | – | – | – | – |
| COLOR PRINTING IN SCANNING | w | x | – | – | – |
| FTP TRANSFER IN SCANNING | x | – | – | – | – |
| MAIL TRANSFER IN SCANNING | x | – | – | – | – |

FIG.17

| | USER 1 |
|---|---|
| COPY APPLICATION | ○ |
| SCANNER APPLICATION | ○ |
| FTP TRANSFER IN SCANNING APPLICATION | × |
| MAIL TRANSFER IN SCANNING APPLICATION | × |
| ⋮ | ⋮ |

| | USER 1 |
|---|---|
| SCAN FILTER | ○ |
| PRINTING FILTER | ○ |
| FTP TRANSFER FILTER | × |
| MAIL TRANSFER FILTER | × |
| ⋮ | ⋮ |

| | USER 1 |
|---|---|
| IMAGE PICKUP PART | ○ |
| PRINTING PART | ○ |
| HDD | × |
| NIC | × |
| USB MEMORY | ○ |
| ⋮ | ⋮ |

501L3

IMAGE FORMING APPARATUS, ACCESS CONTROL METHOD, ACCESS CONTROL PROGRAM AND COMPUTER READABLE INFORMATION RECORDING MEDIUM

BACKGROUND OF THE INVENTION

1. Field of the Invention

The present invention relates to an image forming apparatus, an access control method, an access control program and a computer readable information recording medium and, in particular, to an image forming apparatus provided with an interface for a potable information recording medium, an access control method therefor, an access control program for causing a computer to execute the access control method, and a computer readable information recording medium storing the access control program.

2. Description of the Related Art

A recent image forming apparatus, such as a multi-function peripheral as a typical example, can execute various applications. For example, see Japanese Laid-Open Patent Application No. 2005-269619. Further, it becomes possible to store image data, obtained from scanning in copying operation, as a result of providing with a storage device having a large storage capacity such as a hard disk drive. In consideration that a plurality of users use an image forming apparatus in an office or such in a sharing manner, security for these resources such as the various applications, image data and so forth should be ensured appropriately. That is, in order to protect these resources from a bad faith user, it is necessary to control a usage right for each resource. Further, even for a good faith user, available functions should be limited in some case. For example, the cost required for color copying is higher than that for monochrome copying. Accordingly, if color copying is allowed for any users without limitations, such a situation may be problematic in consideration of cost control. Therefore, for example, depending on a post of each user or such, the usage right should be controlled.

A function to achieve such a control of usage right is called an access control function, and, generally speaking, the function is achieved with the use of access control information such as an ACL (access control list), policy data, or such.

In the related art, the access control information in an image forming apparatus is controlled in a unified manner in a server computer connected via a communication network, or, is controlled in each apparatus. The former way may be suitable for a large-scale user where hundreds of apparatuses are handled, while, the latter way may be suitable for a small-scale user where several apparatuses are handled, for example.

SUMMARY OF THE INVENTION

However, for a medium-scale user where tens of apparatuses are handled for example, any one of these ways may not be suitable. That is, the above-mentioned former way of introducing a server computer to control in a unified manner may be problematic in terms of cost performance in consideration of the costs required for actually introducing the server computer. On the other hand, in the latter way of controlling in each apparatus, the access control information should be maintained for each image forming apparatus, for each occasion of a personal change or such, which may cause a change in the access control information accordingly, and thus, a troublesome work may be required.

The present invention has been devised in consideration of this problem, and an object of the present invention is to provide an image forming apparatus, an access control method, an access control program and a computer readable information recording medium, by which appropriate access control can be easily achieved.

For the purpose of achieving the object, according to the present invention, an image forming apparatus provided with an interface for a portable information recording medium, has an access control part carrying out access control, for respective ones of a plurality of resources which the image forming apparatus has, based on access control information defining whether or not usage thereof by a user is allowed, wherein the access control part carries out the access control based on the access control information stored in the portable information recording medium.

In this configuration, it is possible to easily carry out appropriate access control.

Further, in order to achieve the above-mentioned object, the present invention may be realized in a form of an access control method executed in the above-mentioned image forming apparatus, an access control program for causing an image forming apparatus to execute the access control method, or a computer readable information recording medium storing the access control program.

As a result, it is possible to provide an image forming apparatus, an access control method, an access control program and a computer readable information recording medium, by which appropriate access control can be easily carried out.

Other objects and further features of the present invention will become more apparent from the following detailed description when read in conjunction with the accompanying drawings:

BRIEF DESCRIPTION OF THE DRAWINGS

FIG. 4 shows an example of a static arrangement of software used in the multi-function peripheral in the embodiment of the present invention;

FIG. 5 shows an example of definitions of policy data in the embodiment of the present invention;

FIG. 17 shows an example of policy data in an application level;

FIG. 18 shows an example of policy data in a filter level;

FIG. 19 shows an example of policy data in a hardware resource level; and

DESCRIPTION OF THE PREFERRED EMBODIMENTS

Embodiments of the present invention will now be described.

Figure 1:
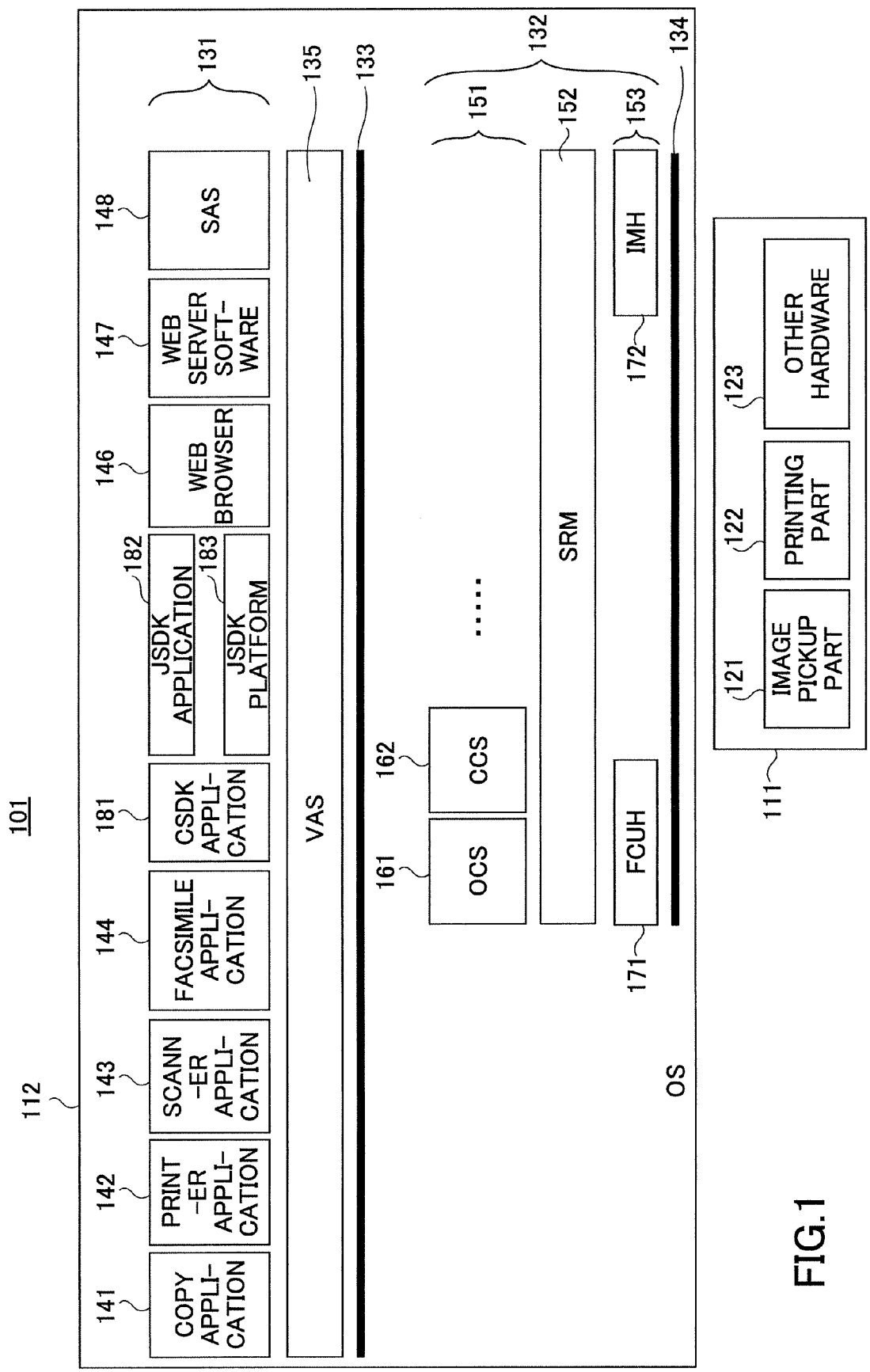
FIG. 1 shows an example of a static configuration of a multi-function peripheral in one embodiment of the present invention for when software is executed.

FIG. 1 shows a configuration example of software in a multi-function peripheral in an embodiment of the present invention The multi-function peripheral 101 in the embodiment shown in FIG. 1 includes various hardware 111 and various software 112.

The hardware 111 of the multi-function peripheral 101 includes an image pickup part 121, a printing part 122, and other hardware 123. The image pickup part 121 reads an image (image data) from a reading original. The printing part 122 prints out image (image data) on a printing paper sheet.

The software 112 of the multi-function peripheral 101 includes various applications 131 and various platforms 132. These programs are executed in parallel by means of an OS (operating system) of UNIX (registered trademark) or such.

The applications 131 include a copy application 141 for copying, a printer application 142 for printing, a scanner application 143 for scanning and a facsimile application 144 for facsimile. Further, a Web browser 146 for viewing a Web page, a Web server software 147 for delivering a Web page, an SDK application service (SAS) 148 for controlling an CSDK application 181 or a JSDK application 182. However, these applications should not necessarily be installed in a ROM, a hard disk drive or such, of the multi-function peripheral 101. That is, these applications may be read and started up from a computer readable information recording medium outside of the multi-function peripheral 101 when they are actually executed. In this view, the configuration example of FIG. 1 does not necessarily show the applications which are not statically installed, but may be realized as a result of being expanded in the ROM when they are actually executed.

The applications 131 include those developed and added by a user or a software vendor after the shipment of the multi-function peripheral 101, with the use of a special SDK (software development kit) provided by the multi-function peripheral 101. The applications 131 thus developed with the use of the special SDK is referred to as SDK applications. As the special SDK, CSDK for developing the application in C language, JSDK for developing the application in Java (registered trademark) language are provided. The applications 131 developed with the use of CSDK are referred to as CSDK applications, and the applications 131 developed with the use of JSDK are referred to as JSDK applications. The multi-function peripheral 101 includes the CSDK applications 181 and the JSDK applications 182. Further the multi-function peripheral 101 includes a JSDK platform 183 as the software 112 acting as an agency between the JSDK applications described in Java (registered trademark) language, and other software described in C language.

As the platforms 132, various control services 151, a system resource manager 152, and various handlers 153, are included. As the control services 151, an operation panel control service (OCS) 161 and a certification control service (CCS) 162 are included. As the handlers 153, a facsimile control unit handler (FCUH) 171 and an image memory handler (IMH) are included.

A process of the OCS 161 carries out control concerning an operation panel. A process of the CCS 162 carries out control concerning authentication processing, access processing and fee charging processing. Other than these, although not shown, as the control services 151, for example, a process for acting as an agency for network communication, a process providing an API for facsimile, a process carrying out stored document delivering processing, a process carrying out control concerning the image pickup part 121 and the printing part 122, a process carrying out control concerning a memory or the hard disk drive, a process carrying out control concerning management of user information, a process carry out system management and so forth are also included.

As the software acting as an agency between the applications 131 and the platform 132, a virtual application service (VAS) 135 is included. The VAS 135 acts as a server process for the applications 131 acting as clients, and also, acts as a server process for the platforms 132 acting as client processes. The VAS 135 has a wrapping function for hiding the platforms 132 from the applications 132, and acts to absorb a version difference caused by a version upgrade of the platforms 132.

Figure 2:
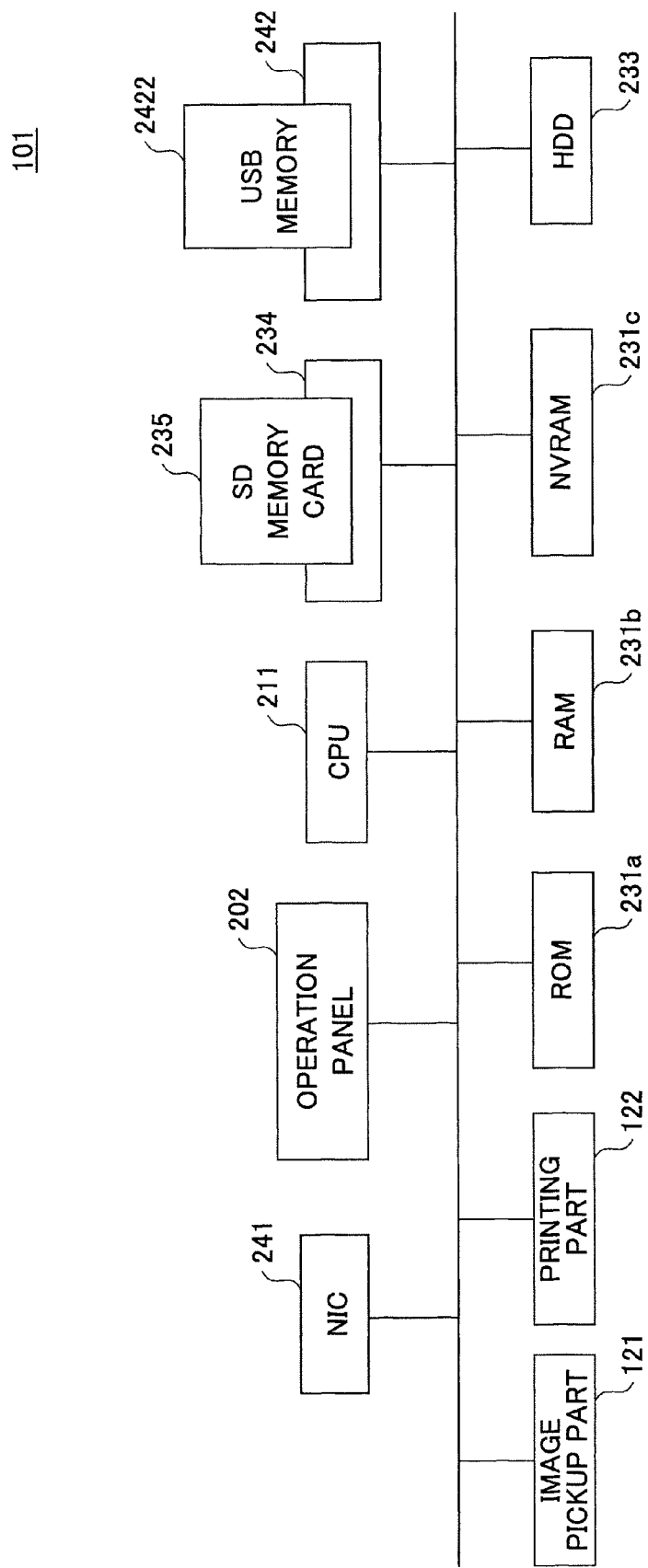
FIG. 2 shows an example of a hardware configuration of the multi-function peripheral in the embodiment of the present invention.

FIG. 2 shows a configuration example of hardware of the multi-function peripheral 101 in the embodiment of the present invention.

The hardware 111 of the multi-function peripheral 101 includes a CPU 211, an SD memory card slot 234, a USB device 242, a ROM 231a, a RAM 231b, an NVRAM 231c, the HDD 233, a NIC (network interface controller) 241, the operation panel 202, the image pickup part 121 and the printing part 122.

The CPU 211 is an IC for various information processing. The SD memory card slot 234 is a slot for inserting an SD memory card 235. The USB device 242 is a device providing a connection terminal in a USB standard for connecting a USB memory 2422. The HDD 233 is storage of the multi-function peripheral 101. The NIC 2431 is a controller for network communication with the use of MAC addresses. The operation panel 202 is hardware (operating part) for inputting in the multi-function peripheral 101 from an operator, and also, is hardware (display part) for outputting information from the multi-function peripheral 101 to the operator.

Figure 3:
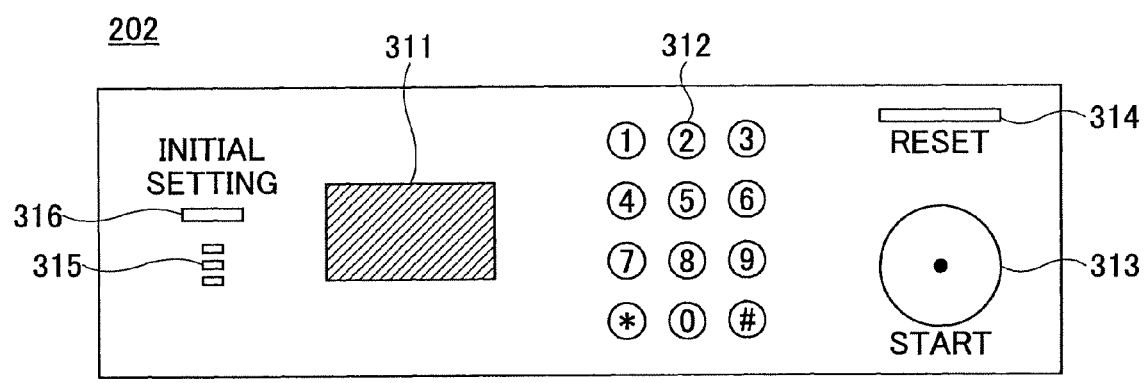
FIG. 3 shows an operation panel.

As shown in FIG. 3, the operation panel 202 includes a touch panel 311, a ten key 312, a start button 313, a reset button 314, a function key 315 and an initial setting button 316. The touch panel 311 is hardware (touch operating part) for inputting with touching operation, and also, is hardware (displaying part) for outputting with screen display. The ten key 312 is hardware for inputting numerals with key (button)

operation. The start button 313 is hardware for starting operation with button operation. The reset button 314 is hardware for reset operation with button operation. The function key 315 is hardware for causing operating pages of the CSDK applications 181 or the JSDK applications 182 to be displayed with button operation. The initial setting button 316 is hardware for causing an initial setting page to be displayed with button operation.

FIG. 4 shows a static arrangement of software used in a multi-function peripheral in a first embodiment of the present invention.

FIG. 4 shows the arrangement example in a static state, i.e., a state in which execution is actually not made yet, of typical software in a hardware configuration, extracted from the hardware configuration shown in FIG. 2, relevant to description below, As shown in FIG. 4, in the first embodiment, the OS, various control services (CS) 151 (OCS 161, CCS 162 and so forth) and the standard applications 140 are stored in the ROM 231a. The SDK applications 180 are stored in a SD memory card 235. The policy data 501a is stored in a USB memory 2422, which is one example of a portable information recording medium.

The standard applications 140 mean applications other than the SDK applications, from among the applications 131, and include the copy application 141, the printer application 142, the scanner application 143, the facsimile application 144, the network application 145, the Web browser 146, the Web server software and so forth.

The policy data 501a is data defining access control information for various resources of the multi-function peripheral 101, i.e., the software resources and the hardware resources. A definition format in the policy data 501a is not limited to a predetermined one, and, in each embodiment of the present invention (including those described below), one shown in FIG. 5 is applied.

FIG. 5 shows an example of definitions in the policy data in the embodiments of the present invention. In the policy data of FIG. 5, for the multi-function peripheral 101, for each application provided to a user (the standard applications 140, the SDK applications 180 and so forth), or each processing unit included in each application, the user's usage rights (i.e., execution right (x), reading right (r) and writing right (w)) are defined. 'Provided to the user' means 'directly operated by the user'.

For example, a user 1 can execute (x) operation of the copy application 141 according to the first line of the policy data of FIG. 5. Also, the user 1 can cause image data to be read (r) from an original in color scanning, according to the fourth line. Further, according to the fifth line, the user 1 can cause image data to be written (w) on a printing paper sheet in color printing in copying.

In FIG. 5, a reference numeral 2422-n (n: 1 through 5) represents each different USB memory 2422. For example, a USB memory 2422-1 stores the policy data 501-1a of the user 1. A USB memory 2422-2 stores the policy data 501-2a of a user 2. In each of the other USB memories 2422-n, the policy data 501-na (n: 1 through 5) for one user is stored.

That is, the policy data, which was managed in a unified manner in the NVRAM 231c, HDD 233 or a server computer, connected via a communication network with the multi-function peripheral 101, for example, in the related art, is stored in the USB memory 2422 which is a portable information recording medium for each user in the embodiment of the present invention. However, a part or all of the policy data 501 may also be stored in the NVRAM 213c in the embodiment of the present invention. By this view (i.e., the policy data 501 should not necessarily be stored in the NVRAM 231c), the policy data 501b in the NVRAM 231c is shown by a broken line.

It is noted that, the definition contents may be or may not be duplicated between the policy data 501a and policy data 501b. That is, when the definitions for the users 1 through 9 are included in the policy data 501a, the definitions for users 10, ..., or those for users 5, ..., may be included in the policy data 501b. In the description below, the policy data is referred to as policy data 501, when the policy data 501a and 501b are distinguished therebetween.

Figure 6:
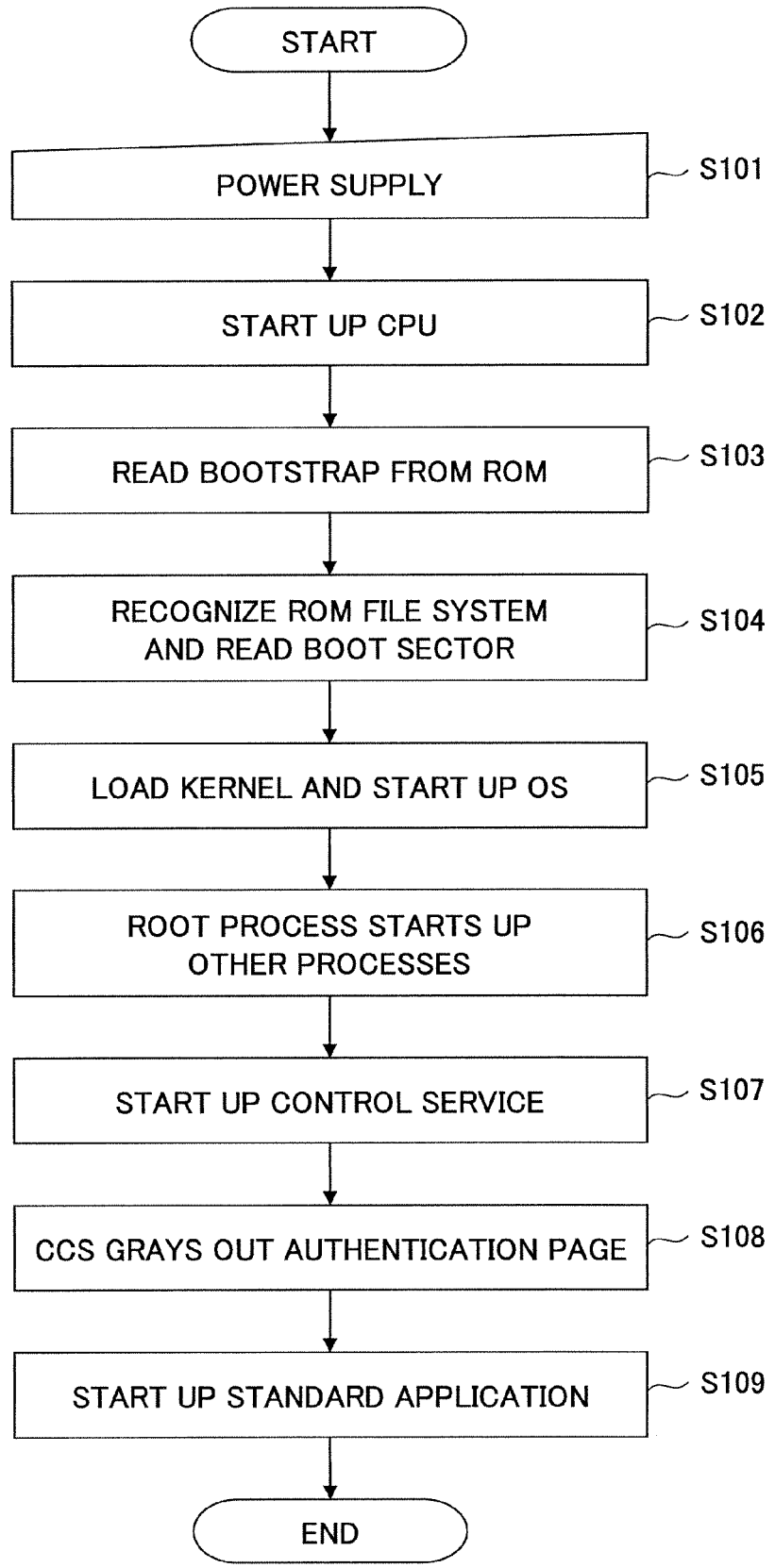
FIG. 6 shows a flow chart illustrating a processing procedure in a multi-function peripheral in a first embodiment of the present invention when the apparatus is started up.

Next, a processing procedure in the multi-function peripheral 101 in the first embodiment of the present invention will be described. FIG. 6 shows a flow chart illustrating a processing procedure when the multi-function peripheral 101 in the first embodiment is started up.

When a main power supply in the multi-function peripheral 101 is started by a user (Step S101), the CPU 211 starts up (Step S102). The CPU 211 reads a bootstrap from the ROM 231a (Step S103), recognizes a file system in the ROM 231a, and reads a boot sector (Step S104). Then, the CPU 211 loads a kernel of UNIX (registered trademark) OS, and starts up the UNIX system (Step S105). Then, a root process in the OS (corresponding to an init process) starts up a predetermined process as a child process (Step S106). For example, from the ROM 231a, various control services in the CS 151b are loaded and started up (Step S107).

Then, the CCS 162 having the authentication function and the access control function in the CS 151, occupies display control of the touch panel 311 of the operation panel 202, and displays an authentication page on the touch panel 311 (Step S108). It is noted that the authentication page means a page for the user to input authentication information (for example, a user ID, a password and so forth).

Then, the CPU 211 starts up the standard application 140 from the ROM 231a (Step S109). It is noted that, although the standard application 140 intends to display an initial page for operation of the standard application 140 on the touch panel 311, the touch panel 311 is thus occupied by the CCS 162 as mentioned above, and thus, the multi-function peripheral 101 enters a standby state in a condition in which the authentication page is displayed. However, the authentication page is grayed out, the user thus cannot input the authentication information, and thus, the user cannot actually use the various resources of the multi-function peripheral 101.

Figure 7:
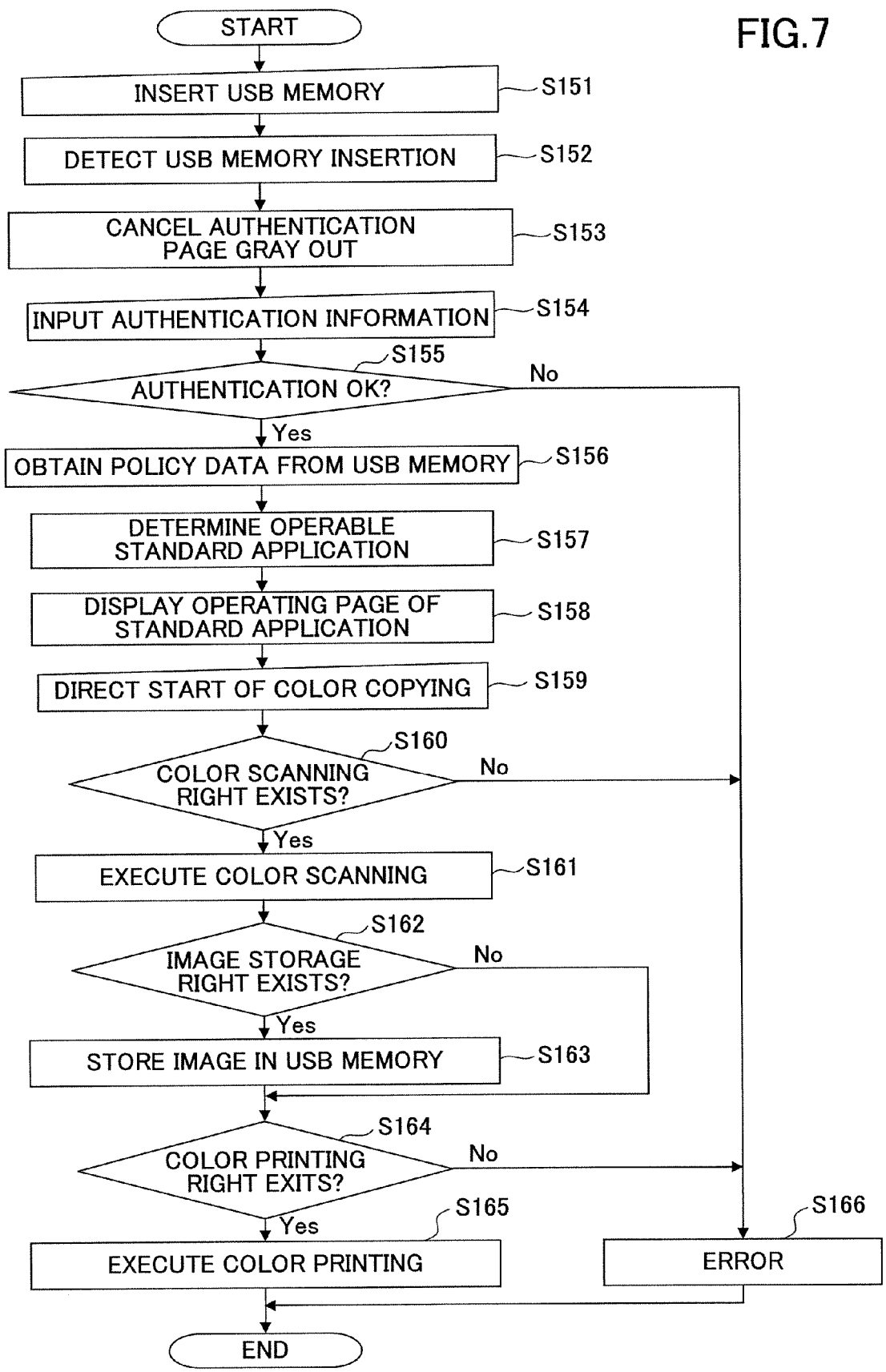
FIG. 7 shows a flow chart illustrating a processing procedure of the multi-function peripheral in the first embodiment of the present invention for when a standard application is used.

Next, a processing procedure by the multi-function peripheral 101 when the user actually uses the standard application 140 of the multi-function peripheral 101 will be described. FIG. 7 shows a flow chart illustrating the processing procedure by the multi-function peripheral 101 when the user uses the standard application 140 of the multi-function peripheral 101 in the first embodiment.

When the user inserts (or connects) the USB memory 2422 storing the policy data 501a, into the USB device 242 of the multi-function peripheral 101 (Step S151), the CCS 162 detects the insertion (connection) of the USB memory 2422 (Step S152).

Figure 8:
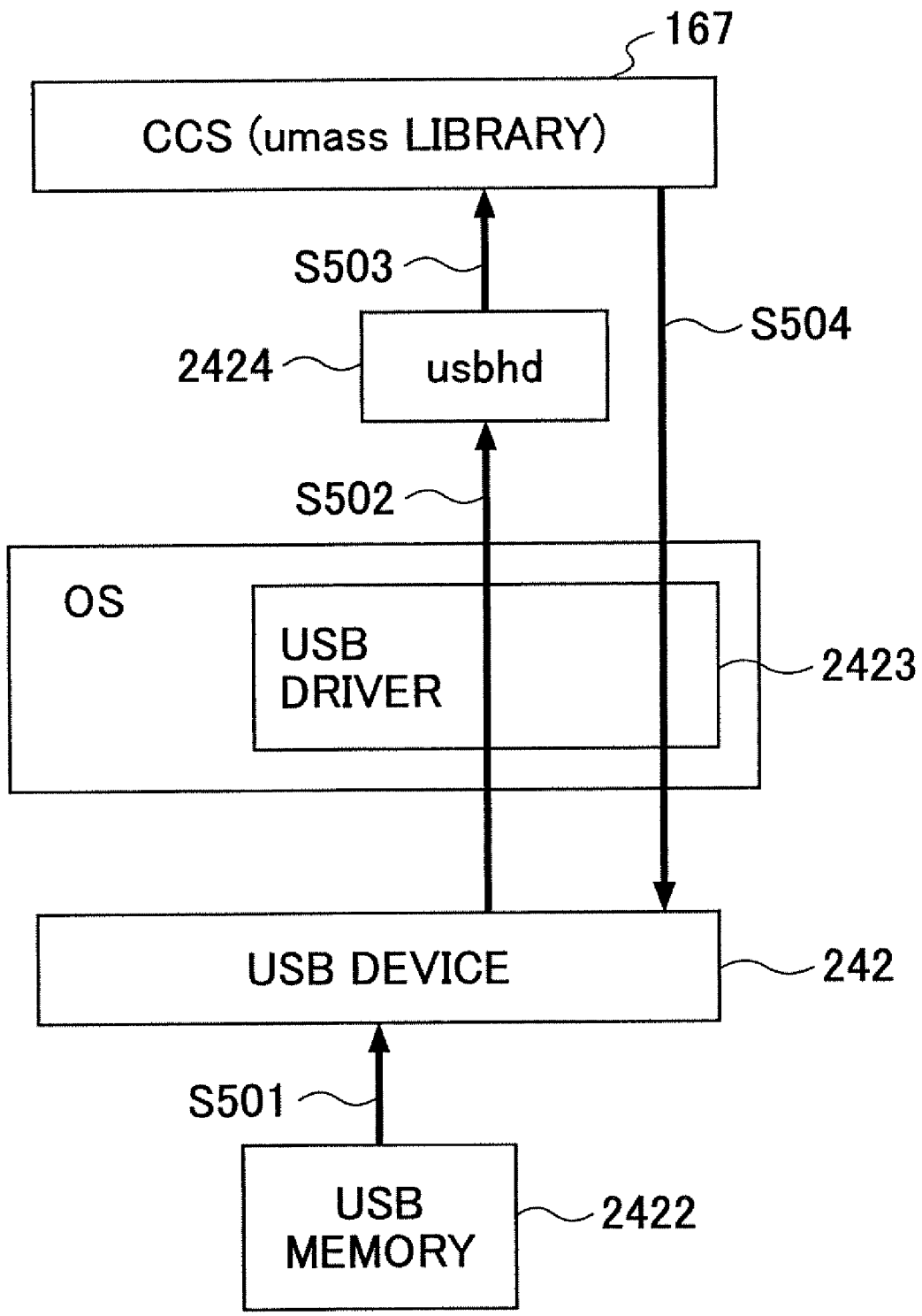
FIG. 8 shows an example of a system for detecting insertion of a USB memory.

FIG. 8 shows an example of a system for detecting the insertion of the USB memory. As shown in FIG. 8, when the USB memory 2422 is inserted in the USB device (S501), this fact is notified of to an usbhd (i.e., a USB hardware daemon) 2424 by means of the USB driver 2423 in the OS. The usbhd 2424 is the daemon process, which carries out automatic mounting/unmounting of the USB memory, connection monitoring for the USB memory, starting up of the application stored in the USB memory or such, and operates in the same layer as that of the various control services.

The usbhd 2424 notifies of the fact that the USB memory 2422 has been inserted, to a module which links to an umass library. Accordingly, in order that the CCS 162 receives the notification that the USB memory 2422 has been inserted, the CCS 162 should link to the umass library (Step S503). After that, the CCS 162 determines whether or not a preparation for actually accessing the USB memory 2422 via the USB driver 2423 has been completed (Step S504).

When detecting the insertion of the USB memory 2422, the CCS 162 cancels the graying out of the authentication page, and thus, allows input of the authentication information from the authentication page (Step S153). Then, when the user inputs the authentication information from the authentication page (Step S154), the CCS 162 carries out authentication based on the thus-input authentication information (Step S155).

When the user is thus authenticated (Yes in Step S155), the CCS 162 obtains the policy data 501a from the thus-inserted USB memory 2422, and expands it in the RAM 231b (Step S156). The CCS 162 also obtains the policy data 501b from the NVRAM 231c if any, and expands it in the RAM 231b.

Then, the CCS 162 determines for the standard application 140 operable by the user, based on the policy data 501 thus expanded in the RAM 231b in the above-described manner (Step S157). That is, for example, when the current user corresponds to the 'user 1', based on the policy data 501-1a shown in FIG. 5, the user is allowed to operate the copy application 141 and the scanner application 143. It is noted that, when the NVRAM 231c also stores the policy data 501b and also the definition contents in the policy data 501b and the definition contents in the policy data 501a of the USB memory 2422 have a duplicate part therebetween, the definition contents in the USB memory 2422 are given priority to be actually applied.

Then, the standard application 140, which is thus determined as being operable by the current user, displays the operating page of this standard application 140 on the touch panel 311 (Step S158). It is noted that, when the plurality of standard applications are determined as being operable by the current user, the actual order as to which one thereof should be first selected to display its operating page should be previously determined. Further, a provision may be made such that, in Step S158, instead of displaying the operating page for the specific application, a page for the user to actually select a specific application is first displayed, and the operating page of the thus-selected application is then displayed. Here, it is assumed that the copy application 141 displays the operating page of the copy application 141, as one example.

Then, it is assumed that, for example, the user sets an original on an ADF (automatic draft feeding device) of the multi-function peripheral 101, and provides an instruction for a color copy function (i.e., scanning the original in color, storing the scanned image and also, outputting the same on a printing paper sheet) via the operation panel 202 (Step S159). In this case, first, the copy application 141 then determines whether or not the current user has the reading right (r) on image data in 'color scanning in copying' (Step S160). In more detail, the copy application 141 inquires of the CCS 162 the right of the current user. The CCS 162 determines the existence/absence of the right, based on the policy data 501 expanded in the RAM 231b, and returns the determination result to the copy application 141. For example, when the current user corresponds to the 'user 1', this user has the right, and thus, it is determined in Step S160 that the user has the right.

When the user does not have the right (No in Step S160), the copy application 141 finishes the processing (Step S166). Thereby, the display of the touch panel 311 is returned to the operating page of the copy application 141.

On the other hand, when the user has the right (Yes in Step S160), the copy application 141 causes the image pickup part 121 to carry out the color scanning (Step S161).

Then, the copy application 141 inquires of the CCS 162, as in Step S160, to determine whether or not the current user has the image data writing right (w) in 'image storage in copying' (Step S162). When the user has the right (Yes in Step S162), the copy application 141 stores the image data thus scanned from the original, in the USB memory 2422 (Step S163).

In the related art, a place in which image data scanned in copying operation was the HDD 233 even for a temporary occasion. However, considering a case where a confidential document is copied, storing in the HDD 233 might be problematic in terms of security. That is, the multi-function peripheral 101 would be accessible by many users, and any person might easily refer the stored contents of the HDD 233 or even bring out the HDD 233 itself.

Therefore, the copy application 141 in the multi-function peripheral 101 in the first embodiment of the present invention stores the image data in the USB memory 2422. For example, by previously distributing the USB memories to respective users, image data scanned in copying operation by a first user is stored in his or her USB memory 2422, and thus, it is possible to prevent another second user from referring to the image data without the first user's permission.

When the current user does not have the image data writing right (w) in 'image storage in copying' (No in Step S162), storage of the image data in the USB memory 2422 is not actually carried out.

In Step S164 after Step S162 or S163, the copy application 141 inquires of the CCS 162, the same as in Step S160, to determine whether or not the current user has the image data writing right (w) in 'color printing in copying'.

When the current user does not have the right (No in Step S164), the copy application 141 finishes the current processing (Step S166). Thereby, the display on the touch panel 311 is returned to the operating page of the copy application 141. On the other hand, when the current user has the right (Yes in Step S164), the copy application 141 causes the printing part 122 to carry out color printing of the image data thus scanned, and finishes the processing (Step S165). Thereby, the display on the touch panel 311 is then returned to the operating page of the copy application 141.

It is noted that, when the USB memory 2422 is removed from the multi-function peripheral 101 in a mid way of the processing of FIG. 7, the CCS 162 is notified of this fact, and the subsequent processing is halted. In this case, the CCS 162 displays on the touch panel 311 the grayed out authentication page, the same as in the standby state entered after the starting up. That is, the USB memory 2422 should be inserted for actual utilization of the multi-function peripheral 101 to be allowed.

As described above, in the multi-function peripheral 101 in the first embodiment, access control is carried out with the use of the policy data 501a stored in the USB memory 2422. Accordingly, by distributing the USB memories to respective users who are allowed to use the multi-function peripheral 101, it is not necessary to manage the policy data in a recording medium provided in the multi-function peripheral 101 or in a separate server computer connected to the multi-function peripheral 101 via a communication network. As a result, it is possible to eliminate a work to maintain the policy data in each multi-function peripheral 101, or to eliminate the extra cost for introducing the separate server computer. Further, the access control information only for each user who actually has the USB memory 2422 is stored in the USB memory 2422. Accordingly, it is possible to increase independence of the policy data 501a in the USB memory 2422 of each user, and thus, even if another user's access control information should be changed, it is not necessary to change the policy data 501a in the USB memories of the users other than this another user, and thus, it is possible to further simplify the maintenance work of the access control information.

It is noted that, the USB memory 2422 may be distributed, not for each user but for each group of a plurality users. In this case, in the policy data 501a of the USB memory 2422, the policy data for the group, or, the policy data for each user belonging to the group should be stored.

Figure 9:
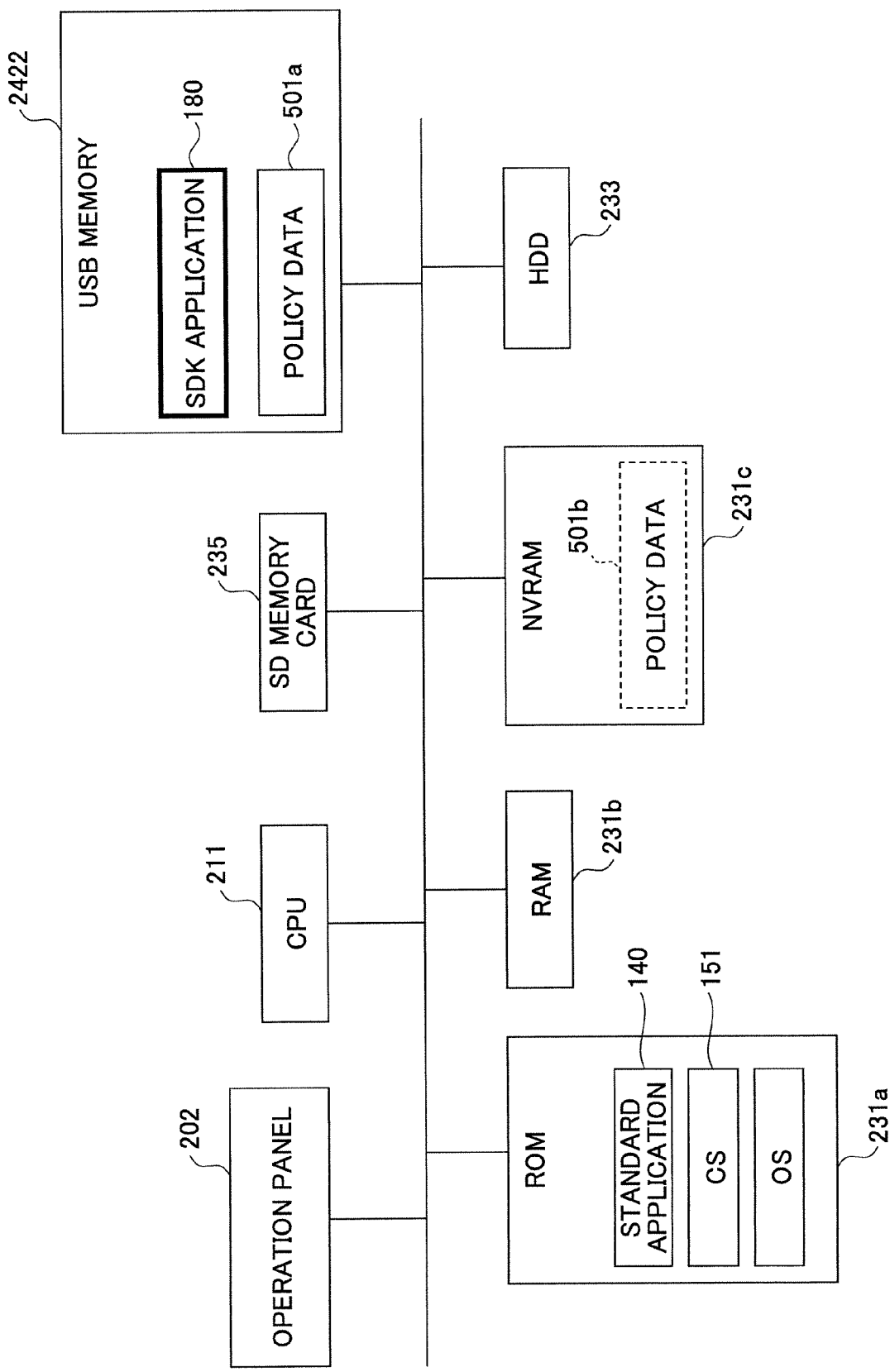
FIG. 9 shows an example of a static arrangement of software used in a multi-function peripheral in a second embodiment of the present invention.

Next, a second embodiment of the present invention will be described. FIG. 9 shows a static arrangement example of software used in the multi-function peripheral in the second embodiment. In FIG. 9, the same reference numerals are given to parts, the same as those in the multi-function peripheral in the first embodiment shown in FIG. 4, and the duplicate description is omitted. What is different in FIG. 9 from the first embodiment of FIG. 4 is a place in which the SDK application 180 is stored. That is, in FIG. 9, the SDK application 180 is stored, not in the SD memory card 235 but in the USB memory 2422.

A processing procedure in the multi-function peripheral 101 in the second embodiment will now be described. Since the processing procedure for starting up of the multi-function peripheral 101 is the same as that of the first embodiment (FIG. 6), the duplicate description is omitted.

Figure 10:
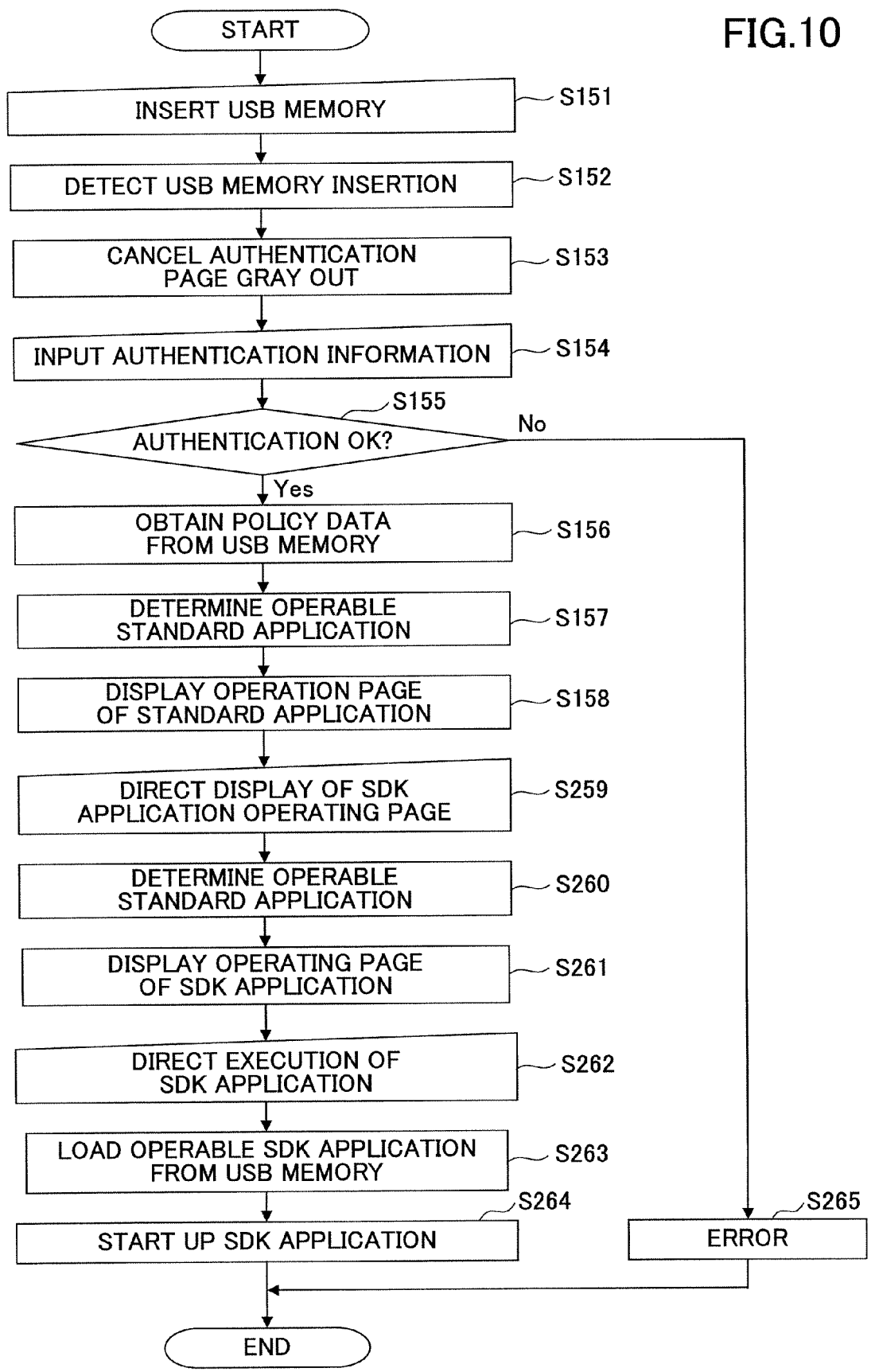
FIG. 10 shows a flow chart illustrating a processing procedure for when an SDK application is used in the second embodiment.

For the second embodiment, a processing procedure of the multi-function peripheral 101 for when the user uses the SDK application 180 is described. FIG. 10 shows a flow chart illustrating the processing procedure of the multi-function peripheral 101 in the second embodiment for when the user uses the SDK application 180. The same step numbers are given to those, the same as those in FIG. 7, and the duplicate description is omitted for FIG. 10. That is, in FIG. 10, Step S151 through Step S158 are the same as those of the first embodiment.

Step S259 is carried out after Step S158, and, when the user operates the function key 315 on the operation panel 202, to give an instruction to display the operating page of the SDK application 180, the CCS 162 determines for the SDK application 180 operable by the current user, based on the policy data 501 (Step S260). It is noted that, although FIG. 5 shows the definitions for the standard application 140, definitions for the SDK application should also be previously stored in the policy data 501.

Then, the OCS 161 displays a page (for example, a page listing the SDK applications operable by the current user) on the touch panel 311, for the user to operate the SDK applications, determined by the CCS 162 as being operable by the current user (Step S261). When the user provides an instruction to execute any one of the SDK applications 180 from the displayed page (Step S262), the usbhd 2424 loads the relevant SDK application 180 (Step S263), and starts up the same in a process (Step S264).

As described above, in the multi-function peripheral 101 in the second embodiment, the SDK application 180 stored in the USB memory 2422 can be executed. Accordingly, by previously distributing the USB memories to the respective users, storing the respective corresponding policy data 501a, and the SDK applications the respective users allowed to use, it is possible to effectively avoid illicit execution of the SDK applications by spoof. That is, although a bad faith person steels the authentication information such as a password, this person cannot actually load the SDK application 180 unless obtaining the USB memory 2424 in which the SDK application 180 is stored.

It is noted that, when the USB memory 2422 is distributed to each user or each user group, only the SDK applications 180 for which the user or the user group is allowed to use should preferably be stored in the USB memory 2422, for the purpose to effectively prevent a user having no usage right from illicitly utilizing the SDK applications 180. In this case, the CCS 162 may determine that usage of the SDK applications stored in the USB memory 2422 is allowed regardless of the definitions in the policy data 501.

Figure 11:
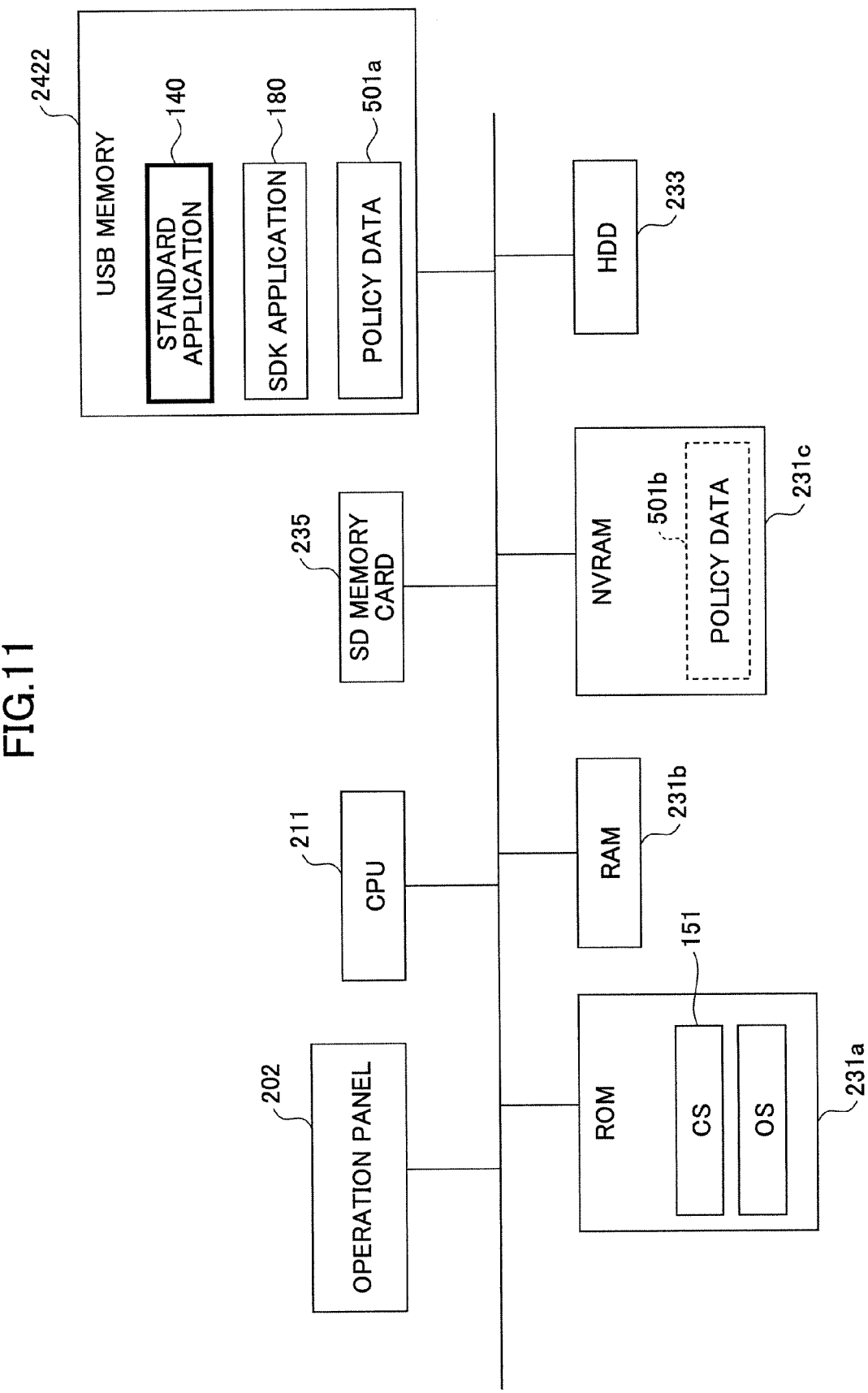
FIG. 11 shows an example of a static arrangement of software used in a multi-function peripheral in a third embodiment of the present invention.

Next, a third embodiment of the present invention will be described. FIG. 11 shows a static arrangement example of software used in the multi-function peripheral in the third embodiment. In FIG. 11, the same reference numerals are given to those, the same as those in the multi-function peripheral in the second embodiment shown in FIG. 9, and duplicate description therefor is omitted. What is different in FIG. 11 from the second embodiment of FIG. 9 is a place in which the standard application 140 is stored. That is, in FIG. 11, the standard application 140 is stored, not in the ROM 231a but in the USB memory 2422.

Figure 12:
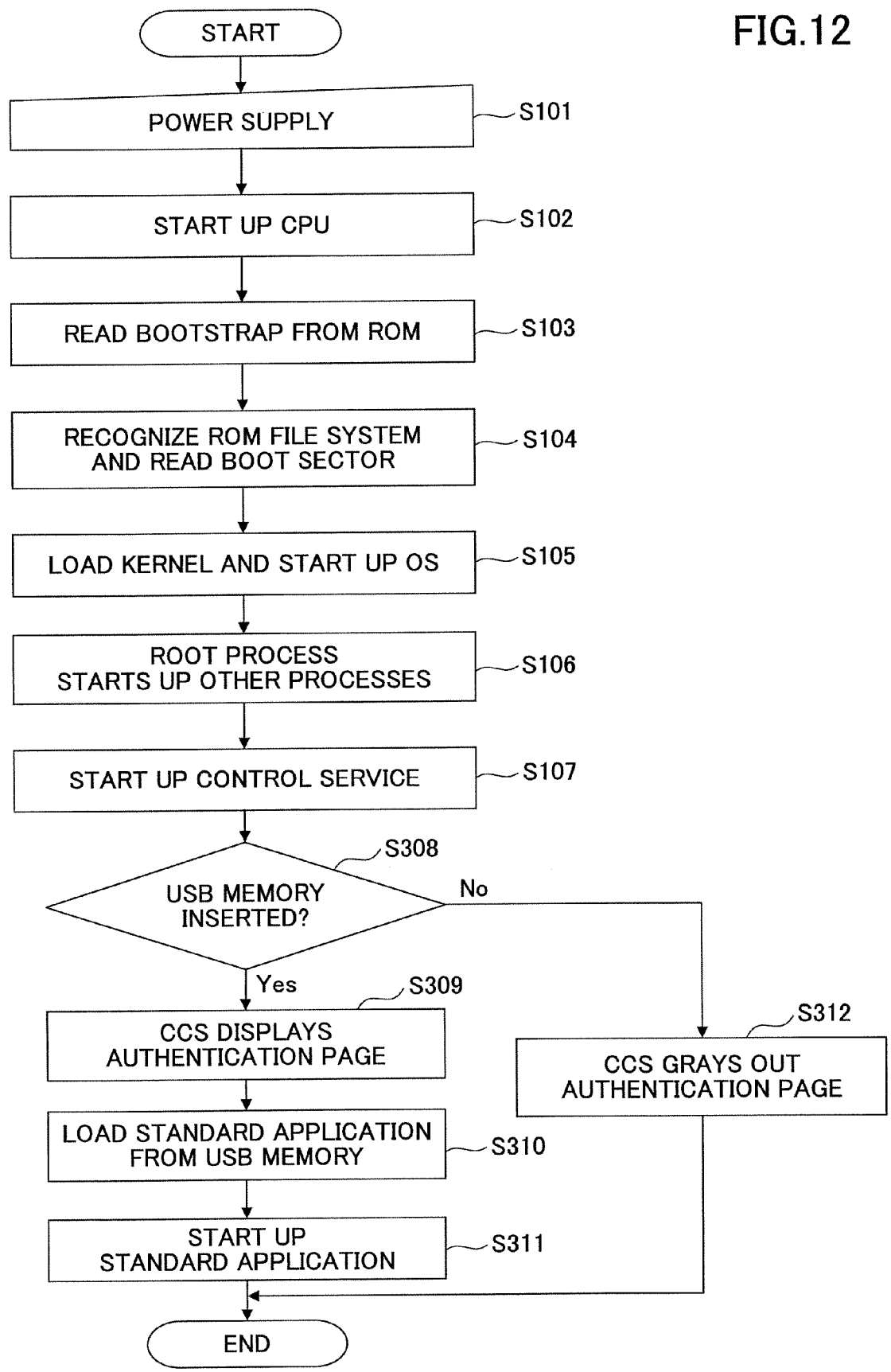
FIG. 12 shows a flow chart illustrating a processing procedure for when the multi-function peripheral in the third embodiment is started up.

A processing procedure in the multi-function peripheral 101 in the third embodiment will now be described. FIG. 12 shows a flow chart illustrating a processing procedure of the multi-function peripheral 101 in the third embodiment when it is started up. In FIG. 12, the same step numbers are given to steps identical to those of FIG. 6, and the duplicate description is omitted.

In Step S308 subsequent to Step S107, the CCS 162 determines whether or not the USB memory 2422 has been already inserted in the USB device 242, via the USB driver 2423. This step is provided for a case where the user may previously insert the USB memory 2422 when the power supply in the multi-function peripheral 101 is started.

When the USB memory 2422 has not been inserted yet (No in Step S308), the CCS 162 occupies the display control of the touch panel 311 of the operation panel 202, and displays the authentication page in a grayed out manner on the touch panel 311 (Step S312). The multi-function peripheral 101 then enters a standby state.

On the other hand, when the USB memory has been already inserted (Yes in Step S308), the CCS 162 occupies the display control of the touch panel 311 of the operation panel 202, and displays the authentication page on the touch panel 311 in such a condition that input therefrom is allowed (Step S309). Then, the usbhd 2424 loads the standard application 140 from the USB memory 2422 (Step S310), and starts up the same in a process (Step S311). The multi-function peripheral 101 then enters a standby state.

Figure 13:
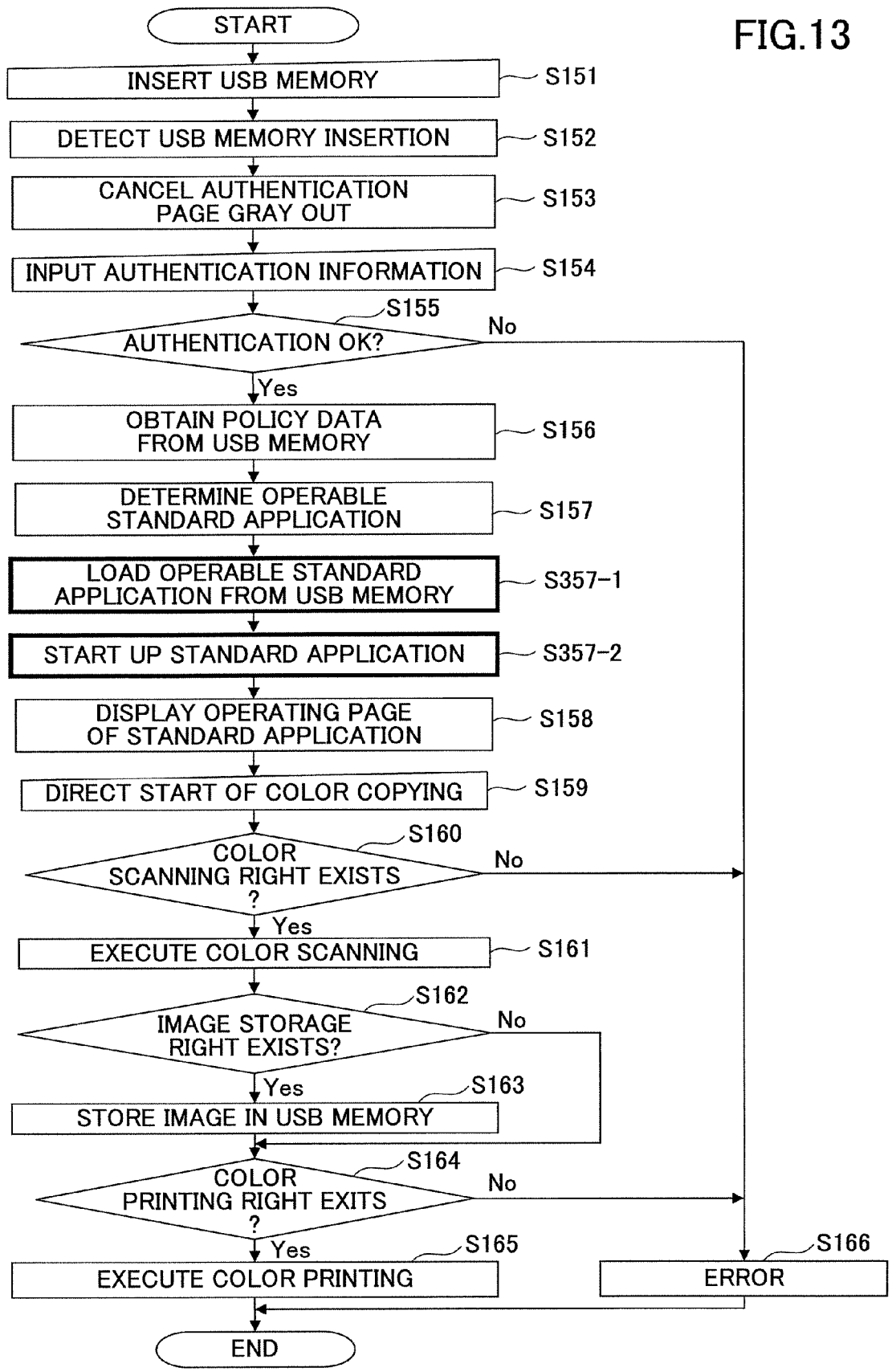
FIG. 13 shows a flow chart illustrating a processing procedure of the multi-function peripheral in the third embodiment for when a standard application is used in a case where a USB memory is not inserted when the apparatus is started up.

Next, a processing procedure of the multi-function peripheral 101 when the standard application 140 is used will be described. FIG. 13 shows a flow chart illustrating a processing procedure for when the standard application 140 is used for a case where the USB memory 2422 is not inserted at a time of the starting up, in the third embodiment. That is, FIG. 13 shows the processing procedure executed after the multi-function peripheral 101 has entered in the standby state in Step S312 of FIG. 12, for actual utilization of the standard application 140. It is noted that, in FIG. 13, the same step numbers are given to steps identical to those of FIG. 7, and the duplicate description is omitted.

In FIG. 13, Step S357-1 and Step S357-2 are newly inserted between Steps S157 and S158.

That is, in Step S357-1, the usbhd 2424 loads, from the USB memory 242, the standard application 140 operable by the current user, determined in Step S157, and starts up the thus-loaded standard application 140 in a process (Step S357-2). The other processing is the same as that of the first embodiment.

Figure 14:
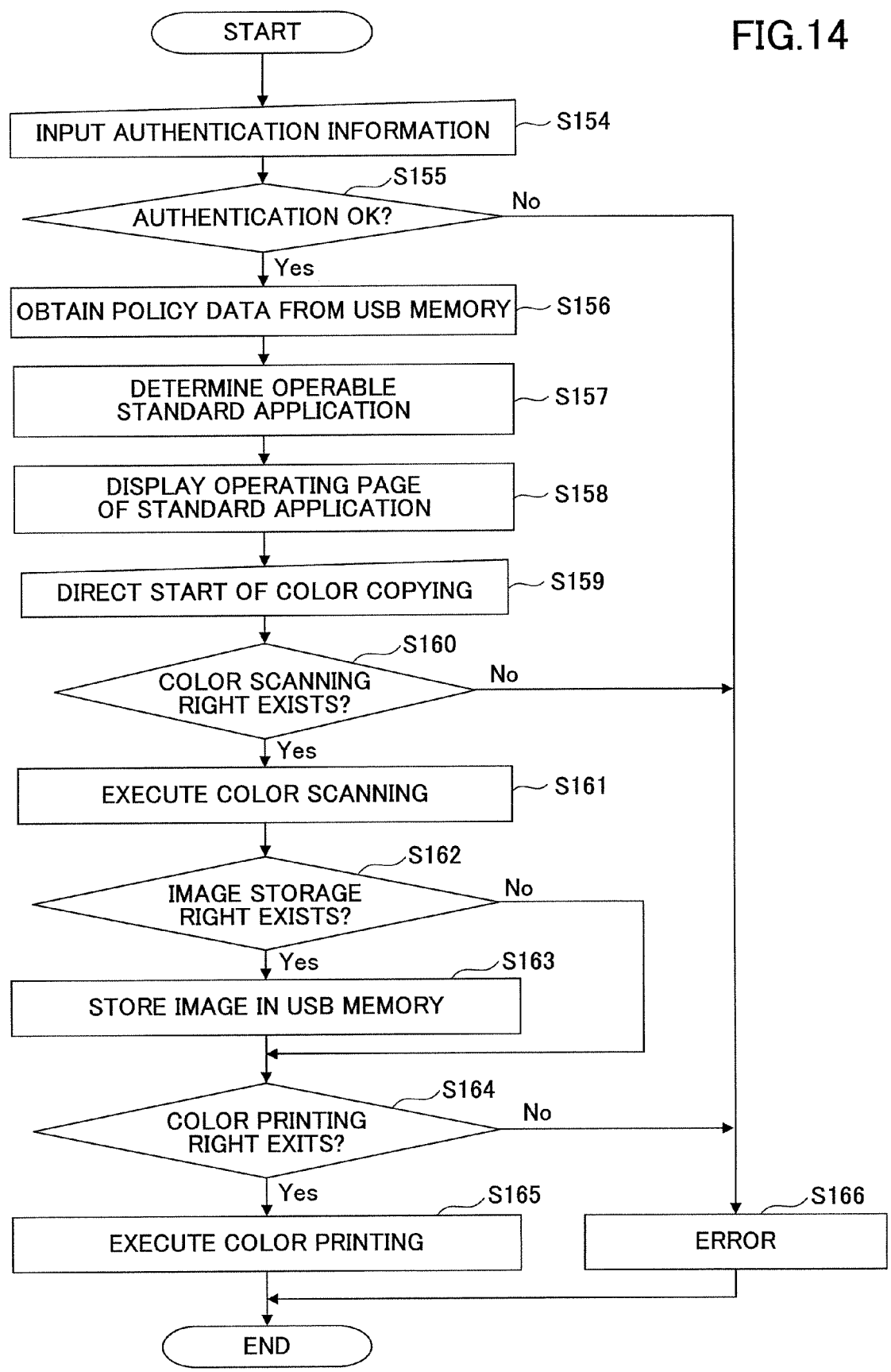
FIG. 14 shows a flow chart illustrating a processing procedure of the multi-function peripheral in the third embodiment for when a standard application is used in a case where a USB memory is inserted when the apparatus is started up.

FIG. 14 shows a flow chart illustrating a processing procedure for when the standard application 140 is actually used for a case where the USB memory 2422 is inserted at a time of the starting up, in the third embodiment. That is, FIG. 14 shows the processing procedure executed after the multi-function peripheral 101 has entered the standby state in Step S311 of FIG. 12. It is noted that, in FIG. 14, the same step numbers are given to steps identical to those of FIG. 7, and the duplicate description is omitted.

In the processing procedure of FIG. 14, Steps S151 through S153 are removed from the processing procedure of FIG. 7. That is, in FIG. 14, the USB memory 2422 has been already inserted at the time of the starting up of the multi-function peripheral 101, and the authentication page has been displayed in such a condition that input therefrom is allowed. Further, the standard application 140, loaded from the USB memory 2422, has been already started up. Accordingly, when the user inputs the authentication information and then, the user is authenticated (Yes in Step S155), the standard application 140 (copy application 141) can be actually executed in the same procedure as that of the first embodiment.

As described above, in the multi-function peripheral 101 in the third embodiment, it is possible to execute the standard application 140 stored in the USB memory 2422. Accordingly, by previously distributing the USB memories to the respective users, storing the respective corresponding policy data 501a, and the standard applications 140 the respective users allowed to use, it is possible to effectively avoid illicit execution of the standard applications 140 by spoof.

Further, since the necessity of storing the standard applications in the ROM 231a is eliminated, it is possible to reduce the memory consumption of the ROM 231a.

It is noted that, when the USB memory 2422 is distributed to each user or each user group, only the standard applications 140 for which the user or the user group is allowed to use should preferably be stored in the USB memory 2422, for the purpose of effectively preventing a user having no usage right from illicitly utilizing the standard applications 140. In this case, the CCS 162 may determine that usage of the standard applications stored in the USB memory 2422 is allowed regardless of the definitions in the policy data 501.

Next, a fourth embodiment of the present invention will be described. For the fourth embodiment, access control for when the applications (the SDK applications, the standard applications, or such) operable in the multi-function peripheral 101, are built by means of an architecture called 'pipe and filter', is discussed. The filter means a program acting as a part (function module) configuring the application. In the architecture called 'pipe and filter', the application is configured by connection of the filters. Further, a medium connection between the filters is referred to as a pipe. The pipe is a virtual transmission medium for inputting information, output from the first filter executed first, into the second filter to be executed subsequently. The pipe is realized by a memory space provided by a hard disk drive, a RAM, a USB memory or such.

Figure 15:
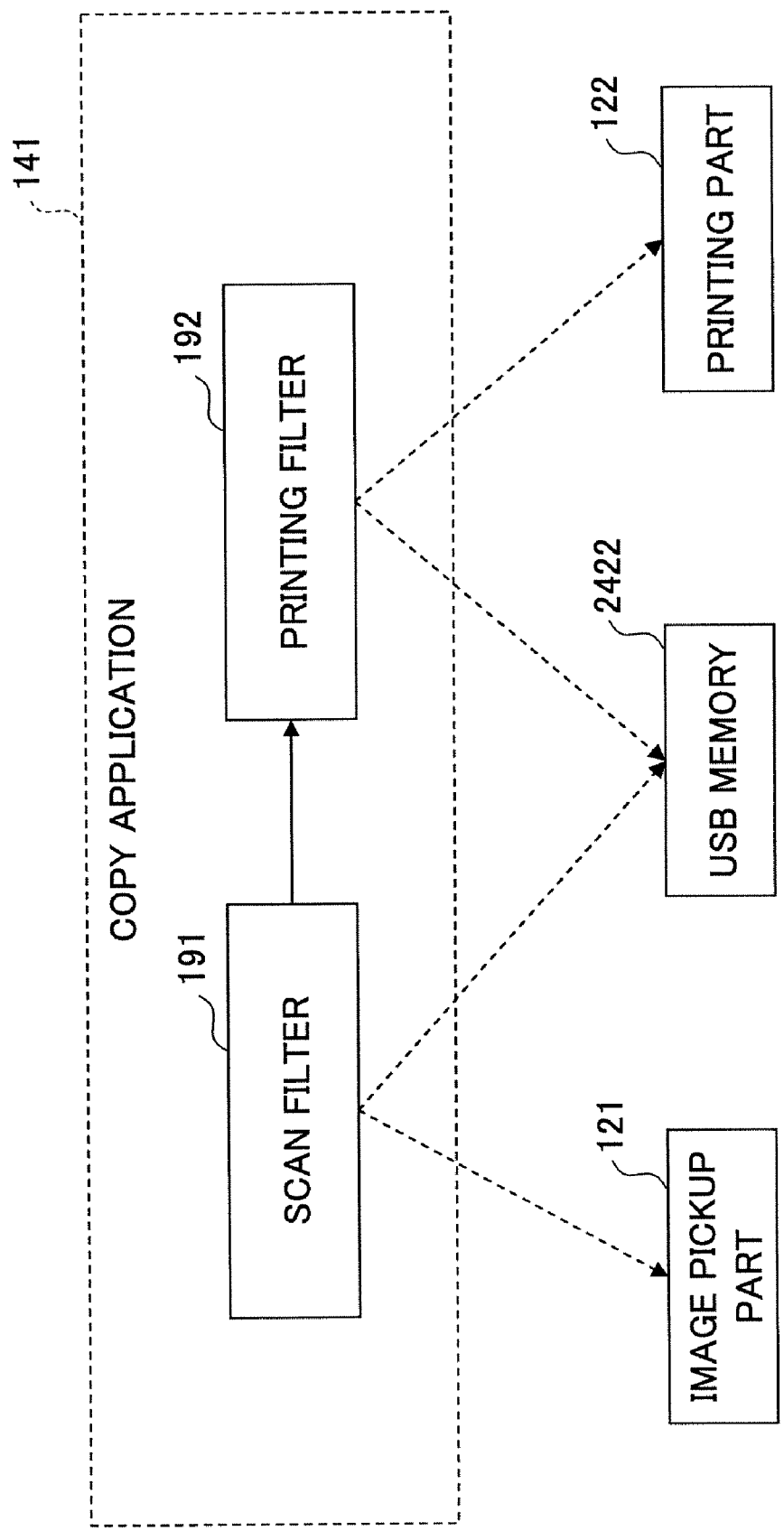
FIG. 15 shows an example of a filter configuration of a copy application.

FIG. 15 shows an example of a filter configuration of the copy application. In FIG. 15, the copy application 141 is configured by a connection between a scan filter 191 and a printing filter 192. the scan filter 191 outputs image data, read from an original by means of the image pickup part 121, into a pipe (for example, the USB memory 2422). The printing filter 192 causes the printing part 122 to print out the image data when detecting the input of the image data to the pipe. Accordingly, a copy function is executed as a result of the operations of the scan filter 191 and the printing filter 192 being executed in sequence.

Figure 16:
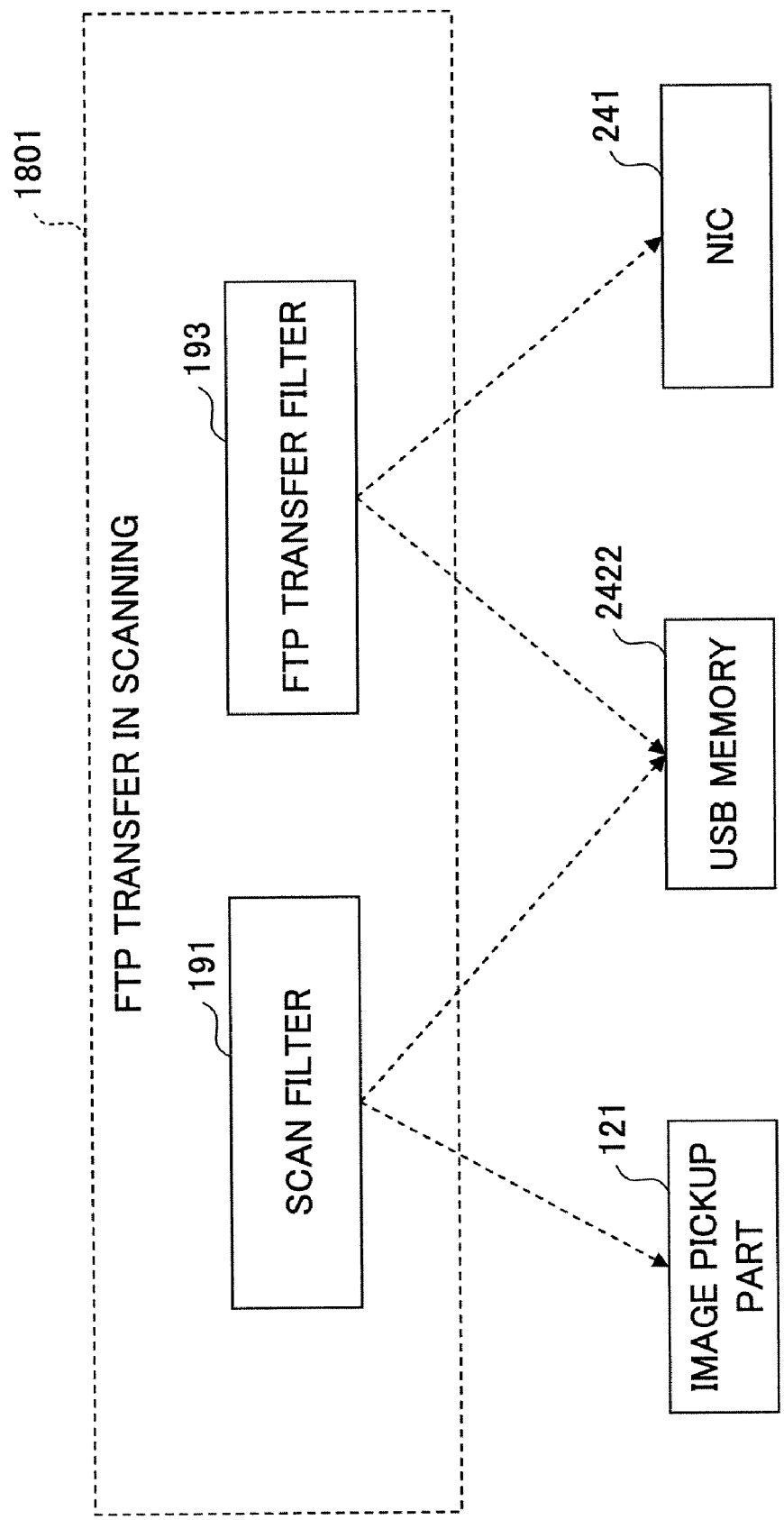
FIG. 16 shows an example of a filter configuration of an ftp transfer application.

FIG. 16 shows an example of a filter configuration of the ftp transfer in scanning application. In FIG. 16, the ftp transfer in scanning application 1801 is configured by a connection between a scan filter 191 and an ftp transfer filter 193. In FIG. 16, the same reference numerals are given to those, the same as those in FIG. 15. Accordingly, the scan filter 191 in FIG. 16 is identical to that of FIG. 15. The ftp transfer filter 193 carries out ftp transfer with the use of the NIC 241 the image data when detecting the input of the image data to the pipe.

When the application in the multi-function peripheral 101 is configured by the pipe and filter, the policy data 501 should define the usage rights in the application level, the usage rights in the filter level and the usage rights in the hardware resource level, respectively.

FIG. 17 shows an example of the policy data in the application level. In the policy data 501L1 of FIG. 17, allowance/inhibition for usage of each application, i.e., the copy application, the scanner application, the ftp transfer in scanning application, the mail transfer in scanning application and so forth, are defined. In the example of FIG. 17, the user 1 is allowed to use the copy application and the scanner application.

FIG. 18 shows an example of the policy data in the filter level. In the policy data 501L2 of FIG. 18, allowance/inhibition for usage of each filter, i.e., the scan filter, the printing filter, the ftp transfer filter, the mail transfer filter and so forth, are defined. In the example of FIG. 18, the user 1 is allowed to use the scan filter and the printing filter.

FIG. 19 shows an example of the policy data in the hardware resource level. In the policy data 501L3 of FIG. 19, allowance/inhibition for usage of each hardware resource, i.e., the image pickup part 121, the printing part 122, the HDD 233, the NIC 241, the USB memory 2422, and so forth, are defined. In the example of FIG. 19, the user 1 is allowed to use the image pickup part 121, the printing part 122 and the USB memory 2422.

In the fourth embodiment, the policy data 501L1, 501L2 and 501L3 are stored in the USB memory 2422 for each user as the policy data 501a.

Figure 20:
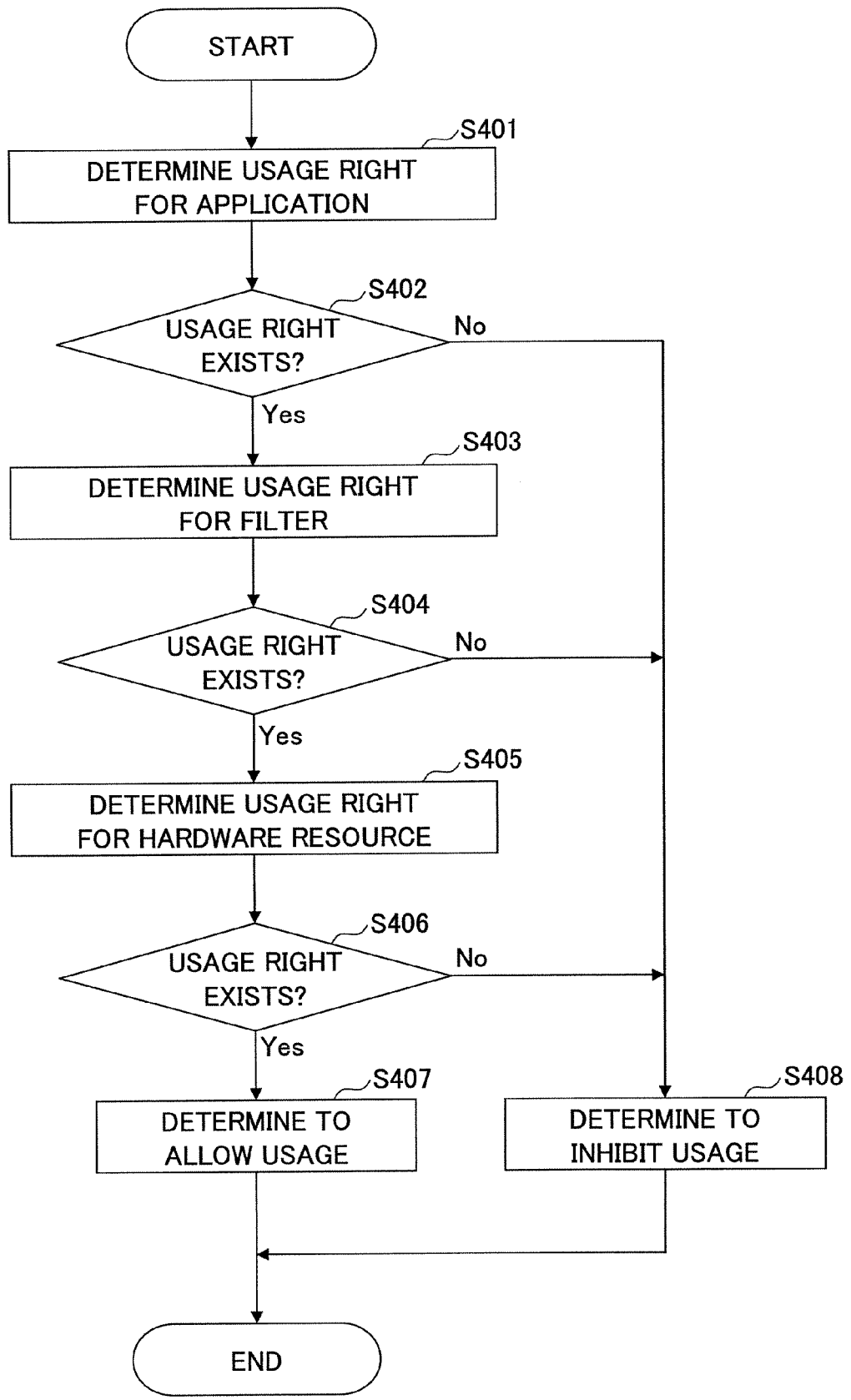
FIG. 20 shows a flow chart illustrating determining processing for a usable application in a fourth embodiment of the present invention.

FIG. 20 shows a flow chart illustrating processing for determining which application is allowed to be used, in the fourth embodiment. That is, FIG. 20 illustrates processing for determining the operable standard applications in Step S157 of FIG. 7, 10, 14 or such, and processing for determining the operable SDK applications in Step S260 of FIG. 10. Accordingly, in the processing of FIG. 20, it is assumed that, the policy data 501L1, 501L2 and 501L3 have been already expanded in the RAM 231b from the USB memory 2422.

First, the CCS 162 determines, based on the policy data 501L1 expanded in the RAM 231c, whether or not the application, for which determination is made (referred to as a target application, hereinafter), is allowed to be used, in Step S401. When usage of the target application is allowed according to the policy data 501L1 (Yes in Step S402), the CCS 162 then determines, based on the policy data 501L2 also expanded in the RAM 231c, whether or not each filter included in the target application is allowed to be used, in Step S403. The determination for each filter included in the target application should be carried out based on information indicating usage relationship between the applications and the filters, previously stored in the HDD 233 or such.

When usage of all the filters included in the target application is allowed according to the policy data 501L2 (Yes in Step S404), the CCS 162 then determines, based on the policy data 501L3 also expanded in the RAM 231c, whether or not each hardware resource used by each filter (i.e., used by the target application) is allowed to be used, in Step S405. The determination for each hardware resource used by each filter should be carried out based on information indicating usage relationship between the filters and the hardware resources, previously stored in the HDD 233 or such.

When usage of all the hardware resources used by each filter is allowed according to the policy data 501L2 (Yes in Step S406), the CCS 162 determines that the target application is usable, that is, allows usage of the target application (Yes in Step S407).

On the other hand, when usage of the target application is not allowed according to the policy data 501L1 (No in Step S402), when usage of at least one of the respective filters included in the target application is not allowed according to the policy data 501L2 (No in Step S404), or when usage of at least one of the respective hardware resources used by each filter included in the target application is not allowed according to the policy data 501L3 (No in Step S406), the CCS 162 determines that usage of the target application is not allowed, i.e., inhibits usage of the target application (No in Step S408).

In the fourth embodiment described above, when a new application is created from a new combination of the existing filters, even if access control information for the new application is not defined in the policy data 501L1, it is possible to carry out access control for the new application based on the policy data 501L2 in the filter level or the policy data 501L3 in the hardware resource level. Further, when a new filter is created and is installed in the multi-function peripheral 101, if access control information for the new filter is not defined in the policy data 501L2, it is possible to carry out access control for the new filter based on the policy data 501L3 in the hardware resource level.

It is noted that, in the above-described embodiments, the access control information defines merely whether or not the usage (operation) is allowed. However, embodiments of the present invention are not limited thereto. For example, the access control information may define that, the usage is allowed when a predetermined condition is met. For example, the usage may be allowed when a predetermined charge has been paid, the usage may be allowed only during a predetermined time zone, or such.

Further, although, in the embodiments, the USB memory is cited as an example of a portable information recording medium, embodiments of the present invention should not be limited thereto. That is, a portable information recording medium storing the policy data 501, the standard applications 140, the SDK applications 180 and so forth, may be any one of various information recording media, for example, an SD memory card, an IC card, and so forth.

The present invention is not limited to the above-described embodiments, and variations and modifications may be made without departing from the basic concept of the present invention claimed below.

The present application is based on Japanese Priority Applications Nos. 2005-363353 and 2006-324750, filed on Dec. 16, 2005 and Nov. 30, 2006, the entire contents of which are hereby incorporated herein by reference.

What is claimed is:

1. An image forming apparatus provided with an interface for an external recording medium, comprising:
   a plurality of software and hardware resources;
   an access control part configured to perform access control, for respective ones of the plurality of software and hardware resources of said image forming apparatus, based on access control information defining whether usage thereof by a user is allowed; and
   an internal recording medium, wherein:
   said access control part performs access control based on said access control information including a plurality of software or hardware policy information stored in said external recording medium, and
   when insertion of the external recording medium is detected, the access control part is configured to allow the user to input authentication information from an authentication page, and after the access control part determines a valid authentication, the access control part obtains the access control information from the external recording medium and expands the access control information in the internal recording medium,
   wherein:
   said access control information stored in said external recording medium defines whether the usage is allowed for a function module included in an application provided to the user or for one of the hardware resources of said image forming apparatus used by an application provided to the user; and
   said access control part determines whether the usage of the application is allowed, based on whether the usage of the function module is allowed or whether the usage of the hardware resource is allowed.

2. The image forming apparatus as claimed in claim 1, wherein:
   before the external recording medium is connected to said image forming apparatus, the usage of the resources is restricted.

3. The image forming apparatus as claimed in claim 1, wherein:
   an application executable in the image forming apparatus is stored in the external recording medium, and
   said access control part determines whether the usage of the application stored in said external recording medium is allowed based on the access control information.

4. The image forming apparatus as claimed in claim 1, wherein:
   an application executable in the image forming apparatus is stored in the external recording medium, and
   said access control part is configured to allow the usage of the application stored in said external recording medium regardless of the access control information.

5. The image forming apparatus as claimed in claim 1, wherein:
   image data generated in response to execution of an application provided to a user is stored in the external recording medium.

6. An access control method executed by an image forming apparatus provided with an interface for an external recording medium, comprising:
   performing access control, at the image forming apparatus, for respective ones of a plurality of software and hardware resources of said image forming apparatus, based on access control information defining whether usage thereof by a user is allowed; and
   providing an internal recording medium, wherein:

the performing access control includes performing access control based on said access control information including a plurality of software or hardware policy information stored in said external recording medium, and the method further comprises:

receiving, when insertion of the external recording medium is detected, user input authentication information from an authentication page, and obtaining, after determining a valid authentication, the access control information from the external recording medium and expanding the access control information in the internal recording medium, wherein:

said access control information stored in said external recording medium defines whether the usage is allowed for a function module included in an application provided to the user or for one of the hardware resources of said image forming apparatus used by an application provided to the user; and the performing access control includes determining whether the usage of the application is allowed based on whether the usage of the function module is allowed or based on whether the usage of the hardware resource is allowed.

7. The access control method as claimed in claim 6, wherein:

before the external recording medium is connected to said image forming apparatus, the usage of the resources is restricted.

8. The access control method as claimed in claim 6, wherein:

an application executable in the image forming apparatus is stored in the external recording medium, and the performing access control includes determining whether the usage of the application stored in said external recording medium is allowed based on the access control information.

9. The access control method as claimed in claim 6, wherein:

an application executable in the image forming apparatus is stored in the external recording medium, and the performing access control includes allowing the usage of the application stored in said external recording medium regardless of the access control information.

10. The access control method as claimed in claim 6, wherein:

image data generated in response to execution of an application provided to a user is stored in the external recording medium.

11. A non-transitory computer readable storage medium encoded with instructions which, when executed by an image forming apparatus provided with an interface for an external recording medium, cause the image forming apparatus to execute an access control method, said method comprising:

performing access control for respective ones of a plurality of software and hardware resources of said image forming apparatus, based on access control information defining whether usage thereof by a user is allowed, wherein:

the performing access control includes performing access control based on said access control information including a plurality of software or hardware policy information stored in said external recording medium, and the method further comprises:

receiving, when insertion of the external recording medium is detected, user input authentication information from an authentication page, and obtaining, after determining a valid authentication, the access control information from the external recording medium and expanding the access control information in an internal recording medium of the image forming apparatus, wherein:

said access control information stored in said external recording medium defines whether the usage is allowed for a function module included in an application provided to the user or for one of the hardware resources of said image forming apparatus used by an application provided to the user; and the performing access control includes determining whether the usage of the application is allowed based on whether the usage of the function module is allowed or based on whether the usage of the hardware resource is allowed.

* * * * *